Feb. 19, 1963 L. F. SCHMID ETAL 3,077,870
INTERNAL COMBUSTION ENGINE ARRANGEMENT
Filed July 6, 1961
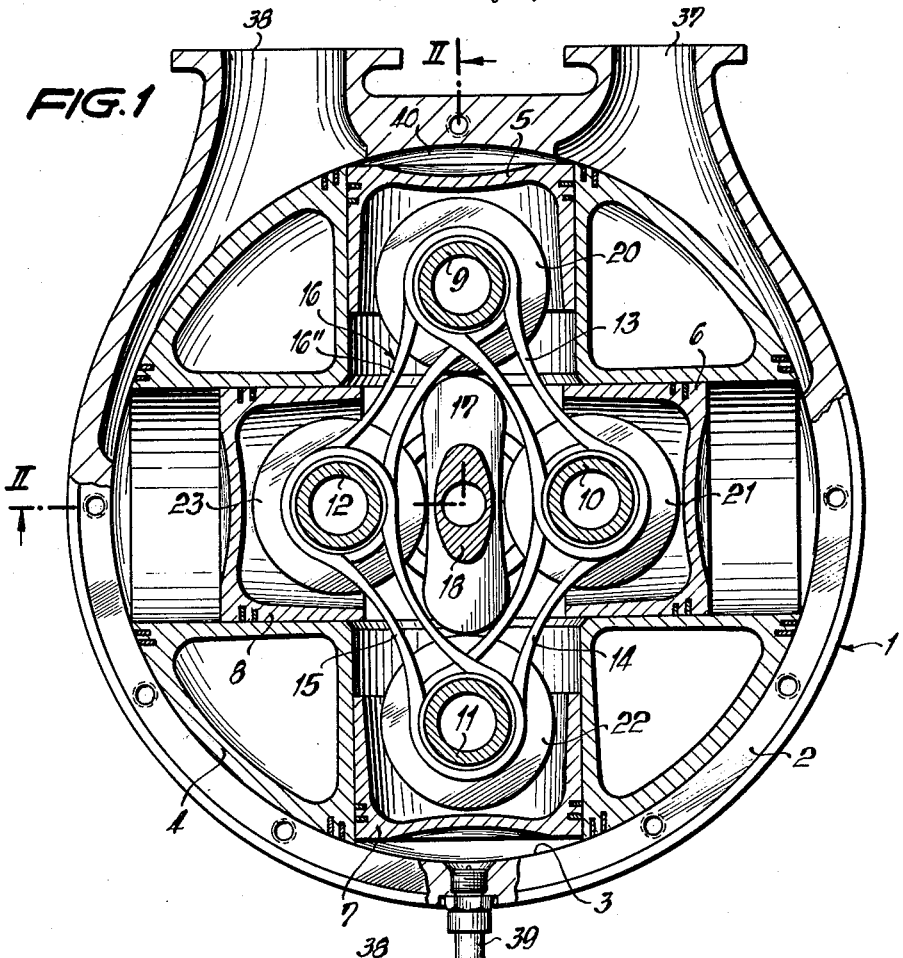
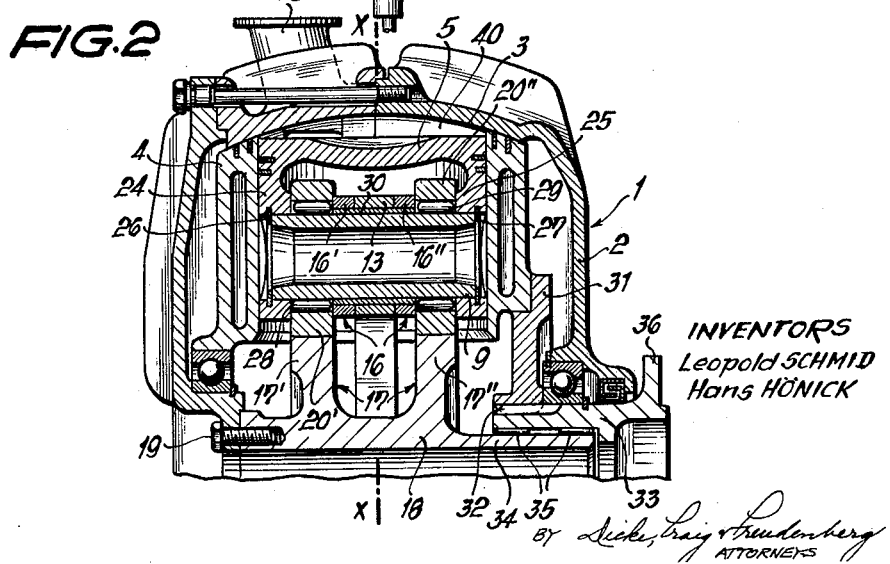
INVENTORS
Leopold SCHMID
Hans HÖNICK
BY Dicke, Craig & Freudenberg
ATTORNEYS 3,077,870
INTERNAL COMBUSTION ENGINE
ARRANGEMENT
Leopold F. Schmid, Stuttgart, and Hans H. Honick, Gerlingen, Germany, assignors to Firma Dr. Ing. h.c.F. Porsche KG., Stuttgart-Zuffenhausen, Germany
Filed July 6, 1961, Ser. No. 122,231
Claims priority, application Germany July 8, 1960
3 Claims. (Cl. 123—44)

The present invention relates to an internal combustion engine provided with rotating cylinders the pistons of which are guided by means of cam disks and which are operatively connected with each other by means of hinge-rods or pivotal links which engage at the wrist pins.

There are known in the prior art constructions in which the pistons are each supported by means of a single roller member at a cam disk. This roller member is supported at the wrist pin in the direction of the longitudinal axis of the piston whereby, on both sides of the roller member, hinge-rods or connecting links for the connection with the adjacent pistons of the internal combustion engine engage thereat. During the working stroke of the piston, this single roller member is considerably loaded by the combustion pressure so that the wrist pin is subjected to relatively large bending moments. For that reason, relatively high-grade materials have to be used in the manufacture of the prior art wrist pin. Additionally, bearing surfaces have to be provided already within the stem of the piston in order to absorb safely the occurring loads and stresses. As a result thereof, the mass of the piston and therewith the centrifugal force which acts on the connecting links is increased. A bending or deflection of the wrist pin, even if it involves only relatively slight magnitudes, has as consequence a locking or jamming of the connecting links so that the bearings thereof become flattened, i.e., receive an elongated out-of-round shape after a relatively short operating period of the internal combustion engine. This may not only be the cause for annoying noises but may also have a disadvantageous effect on the control of the pistons. The guidance of the piston exclusively by one roller member is unstable and labile and cannot prevent a swinging movement thereof about its vertical axis. As a result thereof, the bearings of the connecting rods are also excessively loaded.

These disadvantages are avoided according to the present invention by providing for each piston, at the wrist pin thereof, two contact roller members arranged at a distance from each other which cooperate with the cam disks and by engaging the pivotable connecting links at the wrist pin between the contact roller members. The combustion pressures thereby act on two roller members whereby the pressure at the sliding surfaces of the contact roller member and cam disk are reduced. The loads on the wrist pin and its bearing are also reduced so that the piston, especially the shank or stem portion thereof, may be constructed of lighter weight. There is achieved by means of the two roller members an adequate and satisfactory guidance of the piston and there is also avoided that disadvantageous loads of the connecting links, especially of the bearings thereof occur in operation of the engine. The mounting of the contact roller members as well as of the connecting links at the wrist pin is realized symmetrically with respect to the longitudinal axis of the piston whereby the unfavorable tilting movements of the pistons are also avoided. An advantageous construction results further by the fact that three connecting links engage at the wrist pin intermediate the two contact roller members whereby one connecting link disposed within the piston axis leads to one of the adjoining pistons and the two outer connecting links extend to the other adjoining piston.

Accordingly, it is an object of the present invention to provide an internal combustion engine of the type described hereinabove which effectively eliminates the disadvantages and shortcomings of the prior art constructions in a simple and effective manner.

It is another object of the present invention to provide an internal combustion engine having a rotating cylinder provided with reciprocating pistons in which the pistons are safely guided on cam disks in such a manner as to minimize excessive loads in the bearings as well as undue wear thereof during operation.

Still another object of the present invention resides in the provision of an internal combustion engine of the type described hereinabove in which the combustion pressures are reliably absorbed by simple means, thereby eliminating the need for high grade materials in connection with the wrist pins since the latter are exposed to considerably smaller bending stresses.

Still another object of the present invention resides in the provision of an internal combustion engine of the type described hereinabove in which both the mass and therewith the centrifugal forces occurring within the engine are reduced.

Still a further object of the present invention resides in the provision of an internal combustion engine with rotary cylinders of the type mentioned hereinabove in which premature wear of the bearings and jamming or locking of the movable parts is effectively eliminated or at least the danger for such action effectively minimized.

A further object of the present invention resides in the provision of an internal combustion engine having rotary cylinder means with reciprocating piston means in which the piston means are guided in a stable and operationally reliable manner.

These and other objects, features and advantages of the present invention will become more obvious from the following description when taken in connection with the accompanying drawing which shows, for purposes of illustration only, one embodiment in accordance with the present invention, and wherein FIGURE 1 is a cross sectional view through a rotary piston internal combustion engine in accordance with the present invention, and FIGURE 2 is a cross sectional view taken along line II—II of FIGURE 1.

Referring now to the drawing wherein like reference numerals are used throughout the two views thereof to designate corresponding parts, reference numeral 1 generally designates the internal combustion engine which comprises a multi-partite housing 2. The housing 2 is provided on the inside thereof with a spherically-shaped arcuate runner surface 3 for a rotor 4. The rotor 4 has the form of a spherical zone and includes pistons 5, 6, 7 and 8 which are accommodated in corresponding bores of the rotor 4. The pistons 5, 6, 7 and 8 are provided each with a wrist pin 9, 10, 11 and 12, respectively, with which engage the hinge rods or pivotal connecting links 13, 14, 15 and 16 which interconnect the respective pistons with one another.

The pistons 5, 6, 7 and 8 cooperate with cam disks 17 which are made in one piece with a shaft member 18 (FIGURES 1 and 2). The shaft member 18 is securely fastened, in a detachable manner, to the stationary housing 2.

For purposes of guiding the pistons 5, 6, 7 and 8 along the cam disks 17, each piston 5, 6, 7 and 8 is provided with guide roller members 20, 21, 22 and 23 which are supported at the wrist pins 9, 10, 11 and 12 of respective pistons. In order to keep small the loads at the wrist pins as well as to improve the guidance of the pistons, two roller members each are coordinated to or associated with a respective piston, as is clearly shown in FIGURE 2 in which the roller members 20' and 20" are coordinated to the piston 5. These roller members 20' and 20" are supported directly adjacent the bosses 24 and 25 of the piston 5 in which the wrist pin 9 is supported and in which it is axially secured by known rings 26 and 27. One roller bearing 28 and 29 each is accommodated between a respective roller member 20' and 20" and the wrist pin 9, respectively.

Correspondingly, two cam disks 17' and 17" are arranged on the shaft member 18 which cooperate with the roller members 20' and 20". As a result of such an arrangement, the guidance of the piston within the cylinder is improved and the connecting links, especially the bearings thereof at the wrist pin are relieved of loads.

The connecting links are supported at the wrist pin between the roller members 20' and 20" and more particularly, the connecting link 13 which leads to the piston 6 and the connecting link 16 which leads to the piston 8 (FIGURE 1). In order to attain a point of attack of the connecting link at the wrist pin which is symmetrical to the longitudinal axis of the piston, the connection, for example, between the pistons 5 and 8 is realized by two identical connecting links 16' and 16" which are supported at the wrist pin 9 on both sides of the connecting link 13. The connecting link 13 is disposed in the piston longitudinal axis X—X (FIGURE 2). The connecting links 16' and 16" are constructed correspondingly smaller and are supported together with the connecting link 13 on a preferably common bearing bushing 30.

A double connecting link 14 extends between pistons 6 and 7 and again only a single connecting link 15 is provided between pistons 7 and 8.

An abutment of the roller members of the pistons at the cam disks 17' and 17" is attained by means of the connecting links. This action is improved if the connecting links are pre-stressed so that the roller members are under load.

The rotor 4 is provided with an annular disk 31 (FIGURE 2) which is operatively connected through a spline connection 32 with the shaft 33. The bearing support of the shaft 33 takes place, on the one hand, within housing 2 of the internal combustion engine, and, on the other, at a pin-like projection 34 of the shaft member 18 on which the shaft 33 is supported by means of needle bearings 35. The shaft 33 projects out of the housing 2 and is provided thereat with a flange 36 which serves for purposes of connection with the unit or aggregate to be driven by the engine.

Additionally, a suction line 37 and an exhaust line 38 as well as a spark plug 39 (FIGURE 1) are accommodated within the housing 2.

*Operation*

With rotor 4 rotating in the clockwise direction and starting from the position of the pistons illustrated in FIGURE 1, the piston 5, controlled by means of cam disks 17' and 17" is in the upper dead center position thereof. The piston 5 encloses together with the contact or runner surface 3 of the housing 2 a working or combustion space 40 which increases during further rotation of the rotor 4 in the clockwise direction and, for example, draws in a fuel-air-mixture from line 37. As soon as the piston 5, after an angular rotation of the rotor 4 through 90°, arrives in the lower dead center position thereof, the suction stroke is terminated and there commences the compression of the enclosed fuel air mixture. After a further rotation of the rotor 4 by 90°, the compression stroke of the rotor 4 is terminated and the mixture compressed thereby is ignited by means of spark plug 39. The piston is thereby pressed, with simultaneous rotation of the rotor 4, into the lower dead center position thereof whereupon the rotor 4 opens up the exhaust line 38 so that the burnt gases may be discharged therethrough into the atmosphere.

Consequently, the internal combustion engine according to the present invention operates according to the four-cycle principle whereby during one rotation of the rotor 4 each piston carries out a working stroke. After each rotation of the rotor 4 through 90°, a working stroke takes place so that a considerably more continuous and even drive is achieved thereby.

While we have shown and described one embodiment in accordance with the present invention, it is understood that the same is not limited thereto but is susceptible of many changes and modifications within the spirit and scope of the present invention and we, therefore, do not wish to be limited to the details shown and described herein but intend to cover all such changes and modifications as are encompassed by the scope of the appended claims.

We claim:

1. An internal combustion engine comprising rotary cylinder means, piston means within said cylinder means, cam disk means for guiding said piston means and link means for interconnecting adjacent piston means, each piston means being provided with wrist pin means and two roller means arranged at a distance from each other at the corresponding wrist pin means, said roller means cooperating with said cam disk means, and said link means consisting of three connecting links for each piston means which engage the corresponding wrist pin means intermediate the two roller means thereof, the two outer connecting links leading to one adjacent piston means and the center connecting link leading to the other adjacent piston means.

2. In an internal combustion engine having a rotary cylinder of which the pistons are guided by cam disks and are connected with each other through connecting links which engage at the wrist pins of said pistons, and in which each piston is provided with wrist pin means, the improvement essentially consisting of two roller members for each piston and arranged at the respective wrist pin means at a distance from each other, said roller members cooperating with said cam disks, three connecting links engaging the respective wrist pin means of a piston intermediate the corresponding roller members, the two outer connecting links leading to one adjoining piston and the center connecting link leading to the other adjoining piston.

3. In an internal combustion engine having a rotary cylinder of which the pistons are guided by cam disks and are connected with each other through connecting links which engage at the wrist pins of said pistons, and in which each piston is provided with wrist pin means, the improvement essentially consisting of two roller members for each piston and arranged at the respective wrist pin means at a distance from each other, said roller members cooperating with said cam disks, three connecting links engaging the respective wrist pin means of a piston intermediate the corresponding roller members, the two outer connecting links leading to one adjoining piston and the center connecting link leading to the other adjoining piston, and the two roller members and three connecting links being arranged substantially symmetrically with respect to the longitudinal axis of the corresponding piston.

References Cited in the file of this patent

UNITED STATES PATENTS

| | | |
|---|---|---|
| 696,663 | Barker | Apr. 1, 1902 |
| 716,492 | Sterne | Dec. 23, 1902 |
| 1,793,904 | Caminez | Feb. 24, 1931 |
| 2,718,879 | Rice et al. | Sept. 27, 1955 |